(No Model.)

G. W. DRYDEN.
PULLEY.

No. 439,491. Patented Oct. 28, 1890.

Witnesses

J. Edw. Maybee
H. G. McMillan

Inventor

George W. Dryden
by Donald C. Ridout & Co.
attys

UNITED STATES PATENT OFFICE.

GEORGE W. DRYDEN, OF PORT PERRY, CANADA.

PULLEY.

SPECIFICATION forming part of Letters Patent No. 439,491, dated October 28, 1890.

Application filed April 11, 1890. Serial No. 347,460. (No model.)

*To all whom it may concern:*

Be it known that I, GEORGE WILLIAM DRYDEN, of the town of Port Perry, in the county of Ontario, in the Province of Ontario, Canada, manufacturer, have invented a certain new and useful Improvement in Pulleys, of which the following is a specification.

This improvement relates more particularly to that class of pulleys used for driving belts; to give motion to machinery and the invention consists in the peculiar construction, arrangement, and combinations of parts hereinafter more particularly described, and then definitely claimed.

Figure 2:
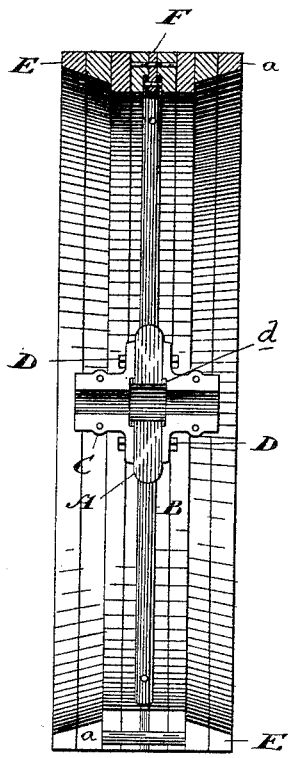
Figure 1:
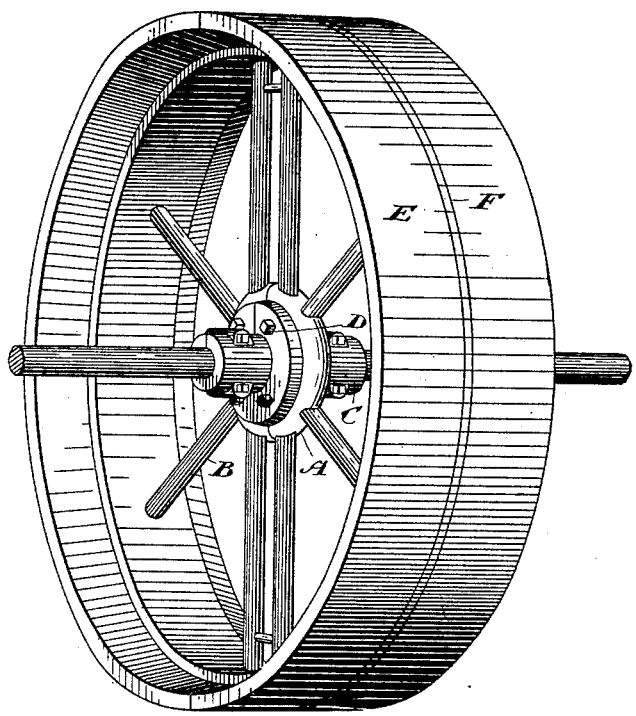
Figure 3:
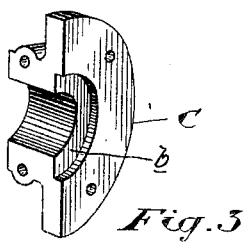
Figure 4:
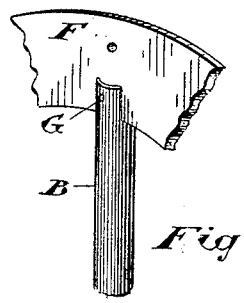

Figure 1 is a perspective view of my improved pulley. Fig. 2 is a cross-section of the said pulley. Fig. 3 is a detail of one-half of my detachable hub. Fig. 4 is a detail of the top of a spoke with a portion of the metal ring inserted in position.

For the purpose of illustrating my invention I have shown it applied to a split pulley made to a wooden rim. It must be seen that so far as the detachable hub is concerned it is applicable to iron as well as wooden pulleys.

In the drawing, A represents the permanent or hub proper of a pulley, in which the spokes B are fastened.

As shown in Fig. 2, the hole through the hub A is made larger than the hole through the detachable hubs C, which are fastened one on each side of the hub A. The detachable hubs C are secured to the hub A by screw-bolts D.

I purpose having for each pulley several detachable hubs C with different-sized holes to fit different-sized shafts, the holes through the hubs C for the bolts D being made by templet, so that the hubs are interchangeable, and in this way a single pulley may be applied to shafts of various sizes.

With a view of providing easy means for connecting the wooden rim E to the spokes B, I insert a metal ring F into a slot made in the end of each spoke B, and secure the ring thus inserted by a rivet G.

It will be seen by reference to the shape of the top of the spoke in Fig. 4 and to the blackened portion at the top of the upper spoke in Fig. 2 that the spokes are made hollow. This not only makes the spokes stronger with the same amount of metal, but there is less metal to cut away in making the slots in their ends, and the cost of making is less.

The ring F is bent to correspond with the proposed circumference of the pulley, and the wooden segmental rings $a$, which form the rim, are secured together and finished in the ordinary way, the inner segments immediately annexed to the ring F being riveted to the said ring.

With the view of relieving the bolts D of any strain, and also to enable the detachable hub C to be easily adjusted in its proper position on the permanent hub, I form in one of said hubs a recess $b$ and on the other a projection $d$, whereby much of the strain is removed from the bolts and the hubs may be readily fitted to each other.

What I claim as my invention is—

A pulley having its hub bored larger than the diameter of the shaft for which it is intended, in combination with a detachable hub bored to fit the shaft, and one of these parts being provided with a projection fitting in a recess in the other, substantially as described.

Port Perry, February 28, 1890.

GEO. W. DRYDEN.

In presence of—
HUBERT L. GOBELS,
THOS. FORMAN.